United States Patent
Zou et al.

(10) Patent No.: US 10,897,143 B2
(45) Date of Patent: Jan. 19, 2021

(54) PASSIVE CELL-BALANCING WITH DYNAMIC CHARGE CONTROL

(71) Applicant: TEXAS INSTRUMENTS INCORPORATED, Dallas, TX (US)

(72) Inventors: Jing Zou, Plano, TX (US); Qiong M. Li, Allen, TX (US); Richard Kane Stair, Knoxville, TN (US)

(73) Assignee: Texas Instruments Incorporated, Dallas, TX (US)

(*) Notice: Subject to any disclaimer, the term of this patent is extended or adjusted under 35 U.S.C. 154(b) by 160 days.

(21) Appl. No.: 16/228,338

(22) Filed: Dec. 20, 2018

(65) Prior Publication Data

US 2020/0067324 A1 Feb. 27, 2020

Related U.S. Application Data (60) Provisional application No. 62/721,297, filed on Aug. 22, 2018.

(51) Int. Cl.
| | | |
|---|---|---|
| H02J 7/00 | (2006.01) | |
| H01M 10/00 | (2006.01) | |
| H01M 10/44 | (2006.01) | |
| H01M 10/0525 | (2010.01) | |
| H01M 10/42 | (2006.01) | |

(52) U.S. Cl.
CPC ....... *H02J 7/0016* (2013.01); *H01M 10/0525* (2013.01); *H01M 10/441* (2013.01); *H02J 7/0021* (2013.01); *H02J 7/0025* (2020.01); *H02J 7/007182* (2020.01); *H01M 2010/4271* (2013.01)

(58) Field of Classification Search
None
See application file for complete search history.

(56) References Cited

U.S. PATENT DOCUMENTS

| | | | | |
|---|---|---|---|---|
| 5,666,006 | A * | 9/1997 | Townsley | H02J 7/0024 307/43 |
| 6,366,054 | B1 * | 4/2002 | Hoenig | G01R 31/386 320/132 |
| 9,112,370 | B2 * | 8/2015 | Yen | H02J 7/0016 |
| 9,318,910 | B2 * | 4/2016 | Kim | H02J 7/007 |
| 9,354,277 | B2 * | 5/2016 | Lin | G01R 31/367 |
| 10,594,143 | B2 * | 3/2020 | Hsiao | H02J 7/0014 |

(Continued)

OTHER PUBLICATIONS

J. Lv et al., "Investigation of dynamic equalisation performance of lithium battery pack management," IET Circuits, Devices & Systems, vol. 11, Iss. 4, 2017, pp. 38-394. (Year: 2017).*

(Continued)

*Primary Examiner* — Leigh M Garbowski
(74) *Attorney, Agent, or Firm* — Lawrence J. Bassuk; Charles A. Brill; Frank D. Cimino (57) ABSTRACT

A device for charging battery cells has conductive lines to be coupled to the battery cells, a charge control circuit coupled to the conductive lines to charge the battery cells, and to determine voltages of the battery cells, and switches to balance the voltages among the battery cells. In operation, the charge control circuit charges the battery cells while determining the voltages of the battery cells, and suspends from charging the battery cells before determining the voltages of the battery cells in a second stage.

20 Claims, 4 Drawing Sheets

(56) References Cited

U.S. PATENT DOCUMENTS

| | | | |
|---|---|---|---|
| 2010/0244847 A1* | 9/2010 | Kudo | G01R 31/3842 |
| | | | 324/433 |
| 2015/0035495 A1 | 2/2015 | Yoshida | |
| 2015/0236529 A1 | 8/2015 | Tanaka et al. | |
| 2018/0115024 A1 | 4/2018 | Sugeno et al. | |
| 2018/0151919 A1 | 5/2018 | Sasaki et al. | |
| 2018/0248386 A1* | 8/2018 | Hale | H01M 10/44 |
| 2019/0280488 A1* | 9/2019 | Tang | H01M 10/441 |

OTHER PUBLICATIONS

Search Report for PCT Application No. PCT/US19/46767, date of mailing of the international search report dated Nov. 14, 2019, 1 page.

* cited by examiner

PASSIVE CELL-BALANCING WITH DYNAMIC CHARGE CONTROL

This application claims priority to U.S. Provisional Patent Application No. 62/721,297, filed Aug. 22, 2018. The entire disclosure of U.S. Provisional Patent Application No. 62/721,297 is hereby fully incorporated herein by reference.

BACKGROUND

Many devices are powered by multiple, series-connected battery cells. Although the battery cells for such devices are usually intended to be essentially identical to each other, they sometimes have certain structural and/or other differences. For many devices, the battery cells may be intended to be essentially identical in times of size, power capacity, maximum voltage, and maximum current, among other things. In general, however, battery cells do not match each other perfectly, and differences between associated battery cells, where such differences include, for example, power capacity, maximum voltage, and maximum current, tend to increase over time. As a result, the cells within the series can be (or can become) unbalanced. Two battery cells that are "unbalanced" do not re-charge in unison, even when they are subjected to the same voltage and current charging conditions. Two battery cells that are "balanced" can be re-charged from the same starting voltage to the same ending voltage over the same time frame by applying the same voltage and current charging conditions to the two cells. When re-charging (or charging) unbalanced batteries, the cell with the highest voltage is at risk of being overcharged, while cells with lower voltages do not become fully charged. The cells that do not become fully charged do not have as much power capacity as they would if they were fully charged, and therefore cannot be fully utilized by the device which is intended to be powered by the cells. This problem with charging battery cells can reduce the total run time of the devices to which the battery cells are connected.

SUMMARY

This disclosure relates to a device for charging battery cells, where the device includes: conductive lines to be coupled to battery cells; a charge control circuit coupled to the conductive lines to charge the battery cells, and to determine voltages of the battery cells; and switches to balance the voltages among the battery cells. The charge control circuit is configured to charge the battery cells while determining the voltages of the battery cells, and suspend from charging the battery cells before determining the voltages of the battery cells in a second stage.

DETAILED DESCRIPTION

Figure 1:
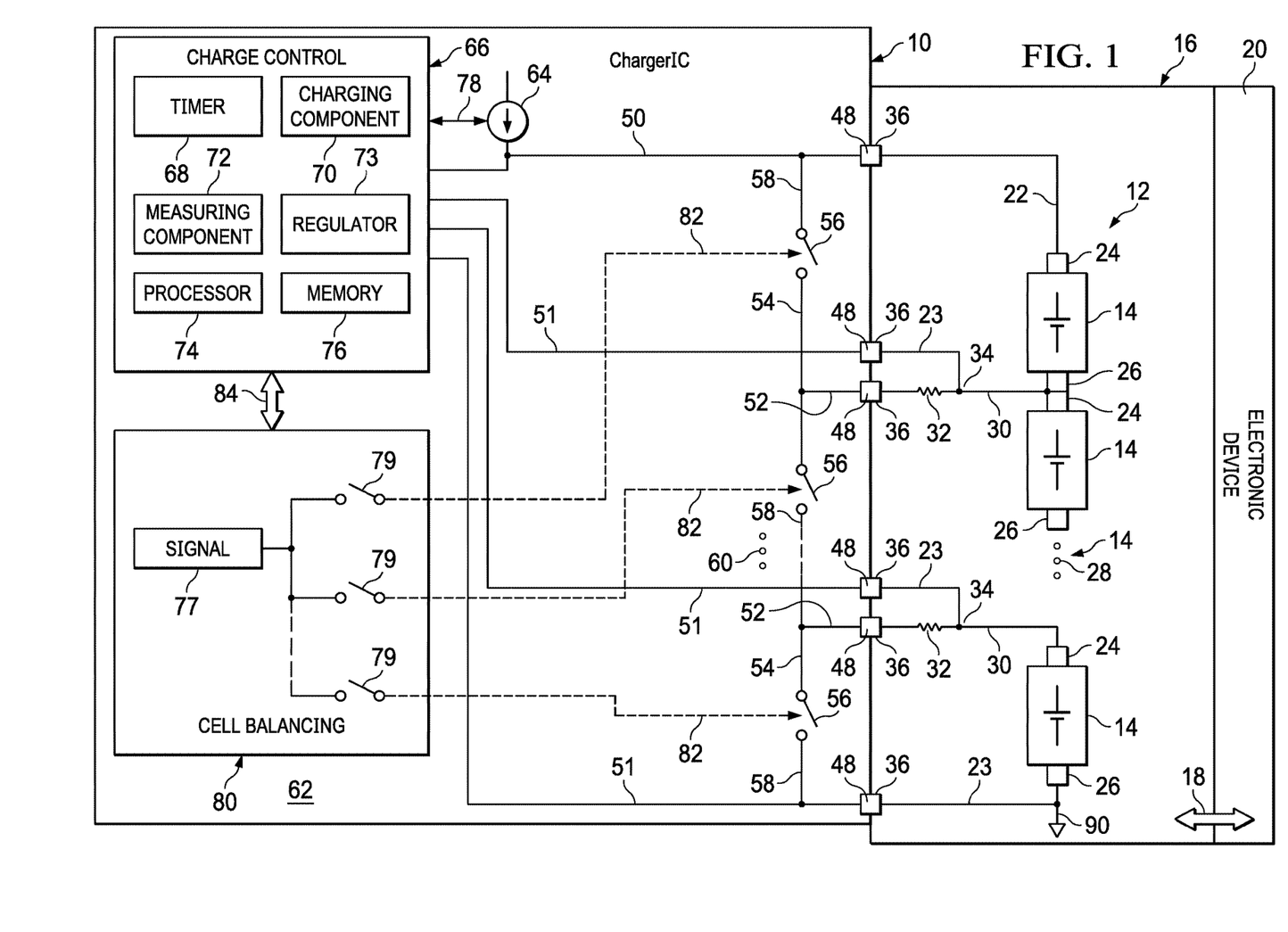
FIG. 1 is a block diagram of an example of a battery-cell charging device connected to a battery pack, where the battery pack includes an array of serially-connected battery cells, and where the battery pack is connected to an electronic device.

This disclosure relates generally to one or more passive cell-balancing solutions. Referring now to the drawings, where like reference numerals designate like elements and steps, there is shown in FIG. 1 an example of a charging device 10 for charging a series-connected array 12 of battery cells 14. The array 12 may be located within a battery pack 16. If desired, the battery cells 14 are individually, or all at the same time, removed from the battery pack 16, and replaced by new, but otherwise similar, battery cells. This disclosure is applicable to any number of battery cells 14, such as four or more battery cells 14 as illustrated in FIG. 1. However, if desired, a battery pack can have only two or three battery cells 14. Moreover, this disclosure is applicable to devices and systems which have battery cells but no battery pack. The devices, systems, and methods described herein are examples; this disclosure is not limited to the devices and systems shown in the drawings.

As illustrated in FIG. 1, the charging device 10 is positioned to be used with a battery-cell array 12 which is electrically connected (18) to an electronic device 20, and can provide electrical energy, through the connection 18, for the electronic device 20. If desired, the battery pack 16 is detachably connected to the electronic device 20, or the battery pack 16 may be structurally integrated into the electronic device 20 and not easily removable from the electronic device 20. The electronic device 20 is, for example, a personal computer, a cordless power tool, an electric vehicle, or an uninterruptable power supply device.

As illustrated in FIG. 1, the battery pack 16 has first and second conductive lines 22, 23 for charging the battery cells 14 and/or for measuring the voltages of the battery cells 14. The first conductive line 22 is electrically connected to a positive terminal 24 of a first battery cell 14, for charging the battery-cell array 12. The first conductive line 22 is also used to measure the voltage of the first battery cell 14. A last one of the second conductive lines 23 is electrically connected to a negative terminal 26 of the last battery cell 14 in the array 12. The other ones of the second conductive lines 23 are electrically connected to adjacent positive and negative terminals 24, 26 of adjacent battery cells 14. The second conductive lines 23 are used to measure the voltages of the battery cells 14 to which the second conductive lines 23 are connected.

In the FIG. 1 configuration, the battery pack 16 has the one first conductive line 22 shown in FIG. 1, and four or more of the second conductive lines 23, for a total of five or more of the first and second conductive lines 22, 23. A repeating structural pattern within the battery pack 16 is designated by a vertical ellipsis 28. Among other things, the vertical ellipsis 28 designates one or more of the second conductive lines 23. However, if desired, the battery pack 16 can have only four or three of the first and second conductive lines 22, 23, especially if the battery pack 16 has only three or two battery cells 14, respectively. In general, if the battery pack 16 has N battery cells 14, then the battery pack 16 may have N+1 of the first and second conductive lines 22, 23. There is one first and second conductive line 22, 23 for each battery cell 14 in the array 12 plus one more second conductive line 23 that is connected to the negative terminal 26 of the last battery cell 14 in the array 12.

The battery pack 16 also has conductive discharge lines 30 for discharging current. The discharge lines 30 are electrically connected to the adjacent positive and negative terminals 24, 26 of the adjacent battery cells 14. As illustrated in FIG. 1, there are fewer discharge lines 30 than battery cells 14, and each discharge line 30 contains one or more resistors 32. The discharge lines 30 each joins at one of the respective electrical nodes 34 with one of the corresponding second conductive lines 23 and the corresponding adjacent positive and negative terminals 24, 26 of adjacent battery cells 14.

In some implementations, a "discharging path" through a resistor 32 for the most highly-charged of the battery cells 14 is turned on such that charging current to the most highly-charged of the battery cells 14 is reduced while the rest of the cells 14 still obtain the full charge current. In the configuration illustrated in FIG. 1, the discharging path for the first battery cell 14 is through a conducting circuit 58, when the conducting circuit 58 is closed by a switch 56. That is, in the illustrated configuration, the discharging path for the first battery cell 14 extends from the negative terminal 26 of the first battery cell 14, through the associated discharge line 30, through the associated node 34, across the associated resistor 32, through connectors 36, 48 (discussed in more detail below), through associated discharge lines 52, 54, across the switch 56 (when the switch 56 is closed, as discussed in more detail below), and from there to the positive terminal 24 of the first cell 14, through connectors 48, 36, and the first conductive line 22.

The discharging paths for the second through next-to-last cells 14 are similar to that of the first cell 14. For each one of the second through next-to-last cells 14, the discharging path is through an associated conducting circuit 58, when the conducting circuit 58 is closed by a switch 56. That is, for each one of the second through next-to-last cells 14, the discharging path is from a negative terminal 26, through the associated discharge line 30, through the associated node 34, across the associated resistor 32, across an associated switch 56, when the switch 56 is closed, and then to a positive terminal 24 of the respective second through next-to-last cell 14, through a resistor 32, node 34, and discharge line 30.

The discharging path for the last battery cell 14 is also similar to that of the first cell 14. The discharging path for the last battery cell 14 is through an associated conducting circuit 58 when the conducting circuit 58 is closed by a switch 56. In particular, the discharging path for the last battery cell 14 is from the negative terminal 26 of the last battery cell 14, through the last one of the second conductive lines 23, through connectors 36, 48, across the switch 56, when the switch 56 is closed, through an associated connection line 54 and a discharge line 52, though connectors 48, 36, across a resistor 32, through a node 34, through a discharge line 30, to the positive terminal 24 of the last cell 14. Each discharging path is "turned on" by closing the respective switch 56. The manner in which the switches 56 are selectively closed is discussed in more detail below. The effect of turning on a discharging path is discussed in more detail below in connection with FIG. 2.

The illustrated charging device 10 is removable from the battery pack 16. The battery pack 16 has electrical connectors 36 for electrically connecting the first and second conductive lines 22, 23 and the discharge lines 30 to the charging device 10. To remove the charging device 10 from the battery pack 16, the connectors (which may be, for example, pin devices) 36 are disconnected from corresponding connectors (which may be, for example, matching pin devices) 48 which are part of the charging device 10.

In the illustrated configuration, the resistors 32 are located within the battery pack 16, between the respective nodes 34 and the connectors 36 for the discharge lines 30. In another configuration (not illustrated), the resistors 32 are located within the charging device 10, such that the resistors 32 are removed from the battery pack 16 when the charging device 10 is removed from the battery pack 16.

The charging device 10 has third and fourth conductive lines 50, 51 for providing electrical communication with the first and second conductive lines 22, 23 of the battery pack 16, and conductive discharge lines 52 for providing electrical communication with the discharge lines 30 of the battery pack 16. In addition, the charging device 10 has conductive connection lines 54 for conducting current through the resistors 32, and switches 56 for closing conducting circuits 58 when it is desired to conduct current through the resistors 32. The illustrated switches 56 are connected to the connection lines 54. A repeating structural pattern within the charging device 10 is designated by a vertical ellipsis 60.

All of the components of the charging device 10 can be connected to or integrated into one or more integrated circuit chips 62 fabricated according to various semiconductor and/or other processes. One or more of the conductive lines 50, 51, 52, 54 can be located on, beneath, or within one or more layers of the one or more integrated circuit chips 62. The switches 56 include transistors or other suitable electronic devices. The electrical connectors 48 for the illustrated charging device 10 are provided at an edge of one of the chips 62, or the connectors 48 can be consolidated together into one or more cables (not illustrated).

Current for the charging device 10 is provided through a suitable current source 64. In the illustrated configuration, the current source 64 provides a constant current level for charging the battery cells 14 and for operating the charging device 10. A conductive path for providing charging current to the battery array 12 is established by the first and third conductive lines 22, 50, which connect the current source 64 to the positive terminal 24 of the first battery cell 14 in the array 12. As illustrated in FIG. 1, the third conductive line 50 is configured to be coupled to the negative terminal 26 of the first battery cell 14 through the associated connecters 48, 36 and the first conductive line 22. The fourth conductive lines 51 are likewise configured to be coupled to other terminals of the battery cells 14 of the array 12. Operational control for charging and measuring (described below) is performed by a charge control circuit 66 which may have a timer 68, a charging component 70, a measuring component 72 (which measures voltages of the battery cells 14 using the first, second, third, and fourth conductive lines 22, 23, 50, 51), one or more processors 74, and one or more memories 76.

The charge control circuit 66 may be operationally connected (78) to the current source 64 to variably control the charging current that is supplied to the battery array 12. Operational control of the switches 56 (described in more detail below) is provided by a cell balancing circuit 80 which selectively sends signals from a suitable signal source 77, through suitable switches 79, and onto signal lines 82 to selectively close and open the switches 56 (according to the repeating pattern 60). The cell balancing circuit 80 is operated by signals that are received from (84) the charge control circuit 66.

All of the battery cells 14 can, if desired, have essentially the same structure (that is, the same size, initial composition, initial charge capacity, initial cell impedance). However, as a practical matter, especially as the battery cells 14 age and are used repeatedly, one of the battery cells 14 might develop an internal cell impedance and/or charging capacity that is different from that of the other battery cells 14. In general, aging causes a battery cell 14 to be charged more quickly during the normal-charge stage 104. When the array 12 is used to provide DC current to the electronic device 20 (or multiple electronic devices), over time and through repeated use, the array 12 becomes drained and must be recharged. Each of the illustrated battery cells 14 can be a lithium-ion (Li-Ion) rechargeable device. This disclosure is also applicable, however, to other suitable voltage devices, including, for example, lithium-polymer rechargeable devices.

If desired, one or more of the illustrated battery cells 14 may be replaced by battery cells which have somewhat different structures. For example, if desired, one or more of the cells 14 can be replaced by a new cell without replacing the other battery cells in the array 12, and, if desired, some of the cells 14 may be one or more other types of rechargeable devices.

Although this disclosure is not necessarily limited to the specific instrumentalities and processes described herein, one of the important concepts of this disclosure is to improve cell balancing with dynamic charge control to ensure each cell is charged properly and charging time is minimized in a cost effective manner with a single charger structure. According to this disclosure, cell balancing can be achieved in a single (just one) charge cycle. These concepts, described in more detail below in connection with FIGS. 2-4, can be implemented in accordance with this disclosure, at least in part, by dynamic charge control as follows: The charging device 10 follows the typical charge profile of a Lithium-ion battery. During trickle charge and pre-charge stages, the cell 14 with the lowest voltage in the array 12 determines the transition from trickle charge to pre-charge, and from precharge to fast charge. During fast charge and constant voltage charge, the cell 14 with the highest voltage dominates the transition from fast charge to constant voltage charge. After charging is completed, re-charging does not start until all of the cell voltages fall below a re-charge threshold.

The solution described in the previous paragraph, and in more detail below, overcomes one or more problems associated with the prior art to a substantial extent. The solution utilizes a single charger structure to achieve dynamic charging and balancing of multiple cells in series with accurate cell-balancing measurement. The optimized maximum charge current is obtained while each cell 14 is properly charged without being overstressed. Cell balancing can be achieved at the end of the charge cycle.

Figure 2:
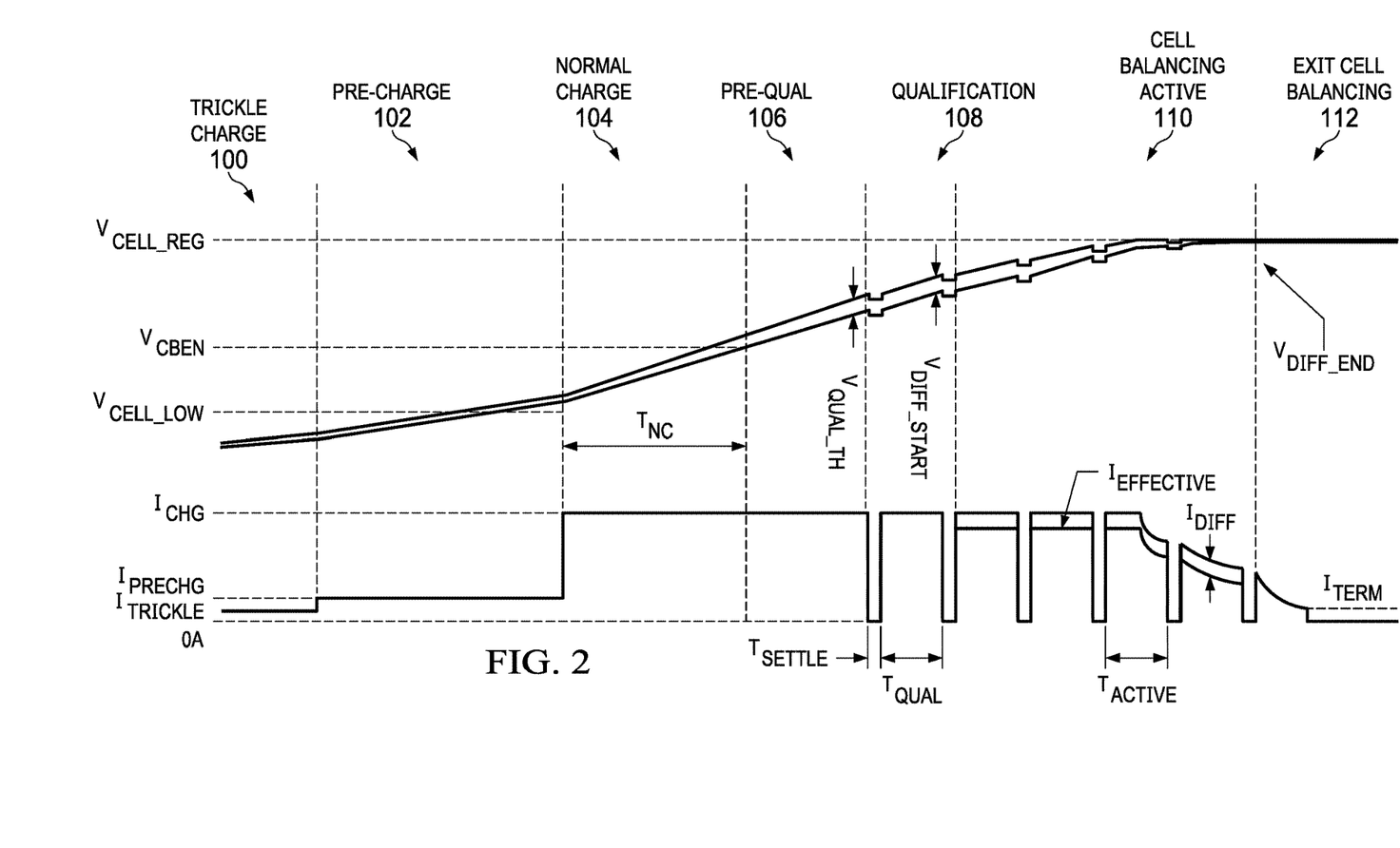
FIG. 2 is a cell-balancing timing diagram for the charging device of FIG. 1.

An example of the charging process is diagrammed in FIG. 2, where time advances from left to right, where current supplied to the battery cells 14 is indicated by the stepped-line in a lower portion of the diagram, and voltages of the most-highly charged of the battery cells 14 and the least-charged of the battery cells 14 are indicated by the two rising lines in a top portion of the diagram. In the illustrated process, the array 12 can be charged by the charging device 10 in a single cycle.

At the start of the charging cycle (represented by the left side of FIG. 2), all of the battery cells 14 typically have experienced loss of charge to various extents through use (e.g., by powering the electronic device 20) and/or by leakage over time. For example, the most-highly charged of the battery cells 14 has a voltage that is in the range of from 2.1V to 2.3V (e.g., about 2.2V), however, if desired, the charging process is operated with higher or lower voltage values.

Before the charging device 10 is connected to the battery pack 16, no charge is applied to the battery cells 14, because the battery pack connectors 36 are disconnected from the corresponding charging device connectors 48. Under this disconnected condition, the amount of current that flows into the battery pack 16 to recharge the cells 14, attributable to the charging device 10, is zero.

Subsequently, when the charging device 10 is connected to the battery pack 16 (that is, when the connectors 36, 48 are connected together, as illustrated in FIG. 1), the device 10 enters a trickle-charge stage 100 (FIG. 2), during which a trickle charge is applied to the battery cells 14. During the trickle-charge stage 100, the amount of current $I_{TRICKLE}$ that flows into the array 12, from the current source 64 (toward ground 90), is a small but non-zero amount ($I_{TRICKLE}>0$), such as, for example, about 100 mA.

A charging process can then begin automatically (in response to the charging device 10 being electrically connected to the battery pack 16) or manually (when desired by a user), and the charging device 10 begins operating in a pre-charge stage 102. During the pre-charge stage 102, a small amount of current ($I_{PRECHRG}$) flows through the first and third conductive lines (also referred to herein as "charging lines") 50, 22 ($I_{PRECHRG}>I_{TRICKLE}$), and the voltages of the battery cells 14 increase gradually.

When the voltages of all of the cells 14 reach a predetermined low voltage ($V_{CELL\_LOW}$), the charging device 10 enters a normal-charge stage 104. The low voltage ($V_{CELL\_LOW}$) is, for example, in the range of from 2.9V to 3.1V (e.g., about 3.0V). At the start of the normal-charge stage 104, the current $I_{CHG}$ which flows into the array 12 is increased ($I_{CHG}>I_{PRECHRG}$) and maintained at a constant level ($I_{CHG}$). During the normal-charge stage 104, the voltages of the battery cells 14 increase further, at a greater rate than occurs during the pre-charge stage 102. At the same time (that is, during the normal-charge stage 104), the difference $V_{DIFF}$ between the voltage of the highest-voltage cell 14 and the voltage of the lowest-voltage cell 14 increases.

Then, after a predetermined amount of time ($T_{NC}$) (measured by the timer 68) has elapsed, the charging device 10 enters a pre-qualification stage 106, which is followed by a qualification stage 108, a cell-balancing active stage 110, and an exit cell-balancing stage 112. The charging device 10 can be removed from the battery pack 16 at any time, including, if desired, during the exit cell-balancing stage 112. Processes that are performed during the pre-qualification stage 106, the qualification stage 108, the cell-balancing active stage 110, and the exit cell-balancing stage 112 are described in more detail below in connection with FIGS. 3 and 4.

Figure 3:
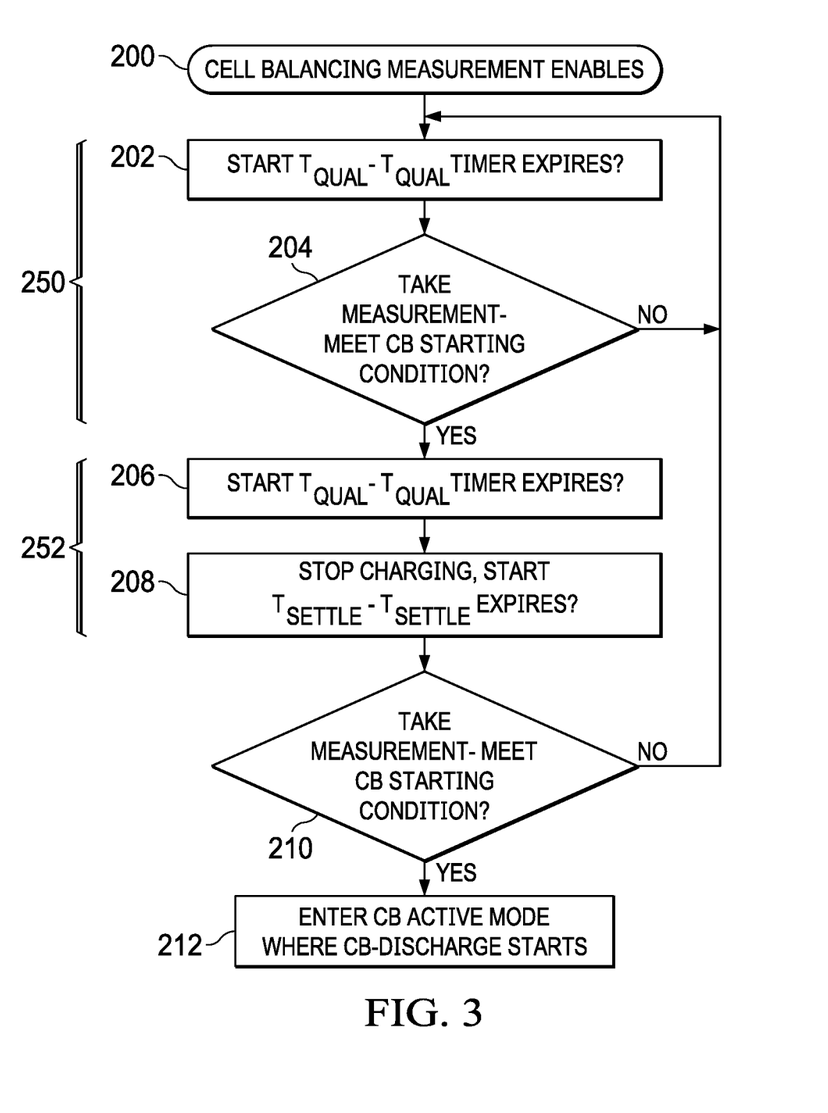
FIG. 3 is a flowchart for a method of operating the charging device of FIG. 1.

Referring now to FIG. 3, a first (or early) step in the charging process is to enable cell-balancing measurement (Step 200). Such enablement (Step 200) occurs in response to the timer 68 reaching the second time $T_{NC}$, at the end of the normal-charge stage 104. Upon enablement (Step 200), the timer 68 is reset (T=0) and started, and then the charging device 10 waits until the timer 68 reaches a predetermined qualification time ($T=T_{QUAL}$) (Yes from Step 202). While the charging device 10 waits for the timer 68 to reach the qualification time ($T=T_{QUAL}$), that is, during Step 202, the battery cells 14 are charged continuously through the first and third conductive lines 22, 50, under the control of the charging component 70, with electrical energy provided by the current source 64.

Then, when the timer 68 reaches the qualification time ($T=T_{QUAL}$) (Yes from Step 202), the voltages of the battery cells 14 are each measured by the measuring component 72. The measuring component 72 determines the cell voltages by measuring the respective voltages on the third and fourth conductive lines 50, 51, and a determination is made by the measuring component 72 as to whether the difference in voltage ($V_{DIFF}$) between the most highly-charged of the cells 14 and another one, such as the lowest-charged, of the cells 14 meets a cell-balancing (CB) starting condition (Step 204).

The cell-balancing starting condition is met, for example, when (1) at least one of the battery cells 14 has a voltage equal to or greater than a predetermined threshold voltage ($V_{QUAL\_TX}$) and (2) the difference in voltage ($V_{DIFF}$) reaches a predetermined threshold ($V_{DIFF}=V_{DIFF\_START}$). As illustrated in FIG. 2, the difference in voltage ($V_{DIFF}$) generally increases from a relatively small value to a larger value during charging (from left to right as shown in FIG. 2), because one of the battery cells 14 is charged more quickly than the other battery cells 14.

If the difference in voltage ($V_{DIFF}$) were not actively reduced during charging, then the voltage of one of the cells 14 could reach an over-voltage protection value before the other cells 14 become as fully charged as desired. Consequently, during the cell-balancing active stage 110, the rate of increase in the charging of the one of the cells 14 is actively reduced relative to the rate of increase in the charging of the other cells 14, so that all of the cells 14 reach a desired voltage together (with $V_{DIFF\_END}=0$, or nearly 0) at the same time (at the end of the cell-balancing active stage 110). According to this disclosure, all of the cells 14 can be charged to the desired voltage in a single charge cycle (that is, with just one pass through the normal charge stage 104 and from there through the cell balancing active stage 110).

The predetermined threshold voltage is, for example, in the range of from 3.7V to 3.8V (see FIG. 2), and the difference in voltage $V_{DIFF\_START}$ is, for example, about 80 mV. These numerical values, however, are just examples. If desired, the process can be operated with higher or lower values. If desired, the difference threshold ($V_{DIFF\_START}$) is user programmable so that a user or administrator can prioritize preferences for rapid charging and complete charging.

In addition, the charging device 10 has a regulation loop for each one of the voltage cells 14. The regulation loops prevent the respective cells 14 from becoming overcharged while still providing charge current to the lower-voltage cells 14. In the illustrated configuration, the regulation loop for the first cell 14 includes the third conductive line 50, a corresponding one of the fourth conductive lines 51, the measuring component 72, and a regulator circuit 73. In the illustrated configuration, the third conductive line 50, the corresponding one of the fourth conductive lines 51, the measuring component 72, and the regulator circuit 73 are coupled to each other, and the regulator circuit 73 is located within the charge-control circuit 66. In operation, when and if the measuring component 72 determines that the voltage of the first cell 14 has reached a predetermined threshold indicating that the first cell 14 is at risk of being overcharged, then the regulator circuit 73 causes the current source 64 to reduce the charge current supplied through the first conductive line 50 so as to maintain the voltage on the first cell 14 while the lower-voltage cells 14 can still be charged up.

In like manner, the regulation loops for the respective second and subsequent cells 14 include the respective fourth conductive lines 51, the measuring component 72, and the regulator circuit 73. If the measuring component 72 determines that the voltage of one of the second or subsequent cells 14 has reached a predetermined threshold, indicating that the second or subsequent cell 14 is at risk of being overcharged, then the regulator circuit 73 causes the current source 64 to reduce the charge current supplied through the first conductive line 50, so as to maintain the voltage on the cell 14 that is at risk of being overcharged while the lower-voltage cells 14 are still being charged up.

Returning again to FIG. 3, if the cell-balancing starting condition has not yet been reached (No from Step 204), then the timer 68 is restarted (T is reset to 0) and the charging device 10 waits until the timer 68 reaches a qualification time (T=$T_{QUAL}$) (Step 202). $T_{QUAL}$ is the interval of time between enablement (Step 200) and qualification measurement (Step 204), which is the same desired interval of time between an unsatisfied qualification measurement (No from Step 204) and a subsequent qualification measurement (Step 204). Then (Yes from Step 202), the voltages of the battery cells 14 are measured again by the measuring component 72 (by measuring voltage differences between the third and fourth conductive lines 50, 51), and a determination is again made by the charging device 10 as to whether the difference in voltage between the most highly-charged of the cells 14 and the lowest charged, or another one, of the cells 14 meets the cell-balancing starting condition (Step 204).

When the cell-balancing starting condition has been reached (Yes from Step 204), then the timer 68 is reset (T=0) and started again, and the charging device 10 waits until the timer 68 reaches the qualification time $T_{QUAL}$ (Step 206). As discussed in more detail below, the charging device 10 applies charge to the battery cells 14 during Step 206, that is, while waiting for the timer 68 to reach T=$T_{QUAL}$. Then (Yes from 206), the charge applied to the battery cells 14 and the first and third conductive lines 22, 50 is discontinued, under the control of the charging component 70, the timer 68 is reset (T=0) and started again, and the charging device 10 waits until the timer 68 reaches a predetermined settling time (T=$T_{SETTLE}$) (Step 208). When the timer 68 reaches the settling time (Yes from Step 208), then the voltages of the battery cells 14 are measured in a settled condition, while charging is suspended (Step 210).

$T_{SETTLE}$ is the time from the suspension of the application of charge until the initiation of measurement by the measuring component 72 (Step 210). The measurement can be performed accurately in Step 210 because impedance effects that would otherwise be caused by current flowing through the battery cells 14 and other devices are avoided (or reduced). The settling time ($T_{SETTLE}$) is, for example, in the range of from 0.5 second to 1.5 seconds, more preferably about 1.0 second, but the settling time could also be, if desired, in the range of from 0 to 100 ms, or in the range of from 10 ms to 1.0 second, or in the range of from 100 ms to 2.0 seconds. These numerical values are merely examples; if desired, the process can be operated with higher or lower values, and, if desired, the settling time is user programmable so that a user can prioritize preferences for rapid charging and complete charging.

As soon as the measurement is performed in Step 210, a determination is made by the charging device 10 as to whether a predetermined cell-balancing starting condition has been reached (Step 210). If the cell-balancing starting condition has been reached (Yes from Step 210), then the process enters a cell-balancing active mode during which cell balancing discharge starts (Step 212). On the other hand, if the determination at Step 210 is that the cell-balancing starting condition (accurately measured, because charging is suspended during Step 210) has not been reached, then the process returns (No from Step 210) to Step 202, and the process continues.

Thus, according to the process illustrated in FIG. 3, a determination as to whether the cell-balancing starting condition has been reached is performed at least twice. The determination as to whether the starting condition has been reached is made each time the process reaches Step 204, and each time the process reaches Step 210. The determination(s) made at Step 204 ensure(s) that the process does not go far beyond the starting condition during continuous charging, and the determination(s) made at Step 210 ensure(s) that the starting condition is determined accurately (while charging is suspended) before the process advances (Yes from Step 210) to the cell-balancing active mode (Step 212).

The cell-balancing starting condition that is applied in Step 210 can be essentially the same as the cell-balancing starting condition that is applied in Step 204, but the determination as to whether the starting condition has been met is performed with greater accuracy in Step 210 (when the battery cells 14 have been permitted to settle to avoid or minimize impedance effects). If desired, however, the cell-balancing starting condition that is applied in Step 210 is different from the cell-balancing starting condition that is applied in Step 204. If desired, one or more of the cell-balancing starting conditions is user programmable.

The process that is illustrated in FIG. 3 operates in two, mutually-exclusive stages 250, 252. The second stage 252 is always preceded by the first stage 250, and the first stage 250 is always followed by the second stage 252 (Yes from Step 204). The first stage 250 is repeated whenever measurements taken by the measuring component 72 at Step 204 do not meet the cell-balancing starting condition (No from Step 204). The first and second stages 250, 252 are both repeated whenever the measurements taken by the measuring component 72 at Step 210 do not meet the cell-balancing starting condition (No from Step 210).

The measurements that are taken in Step 204 (that is, within the first stage 250) are performed without suspending charging. Charging is continuous during the first stage 250. The measurement that is taken in Step 210 (that is, within the second stage 252) is performed while charging is suspended, and after the battery cells 14 have been permitted to settle. The charging device 10 enters the cell-balancing active mode (Step 212) only when the measurements that are taken in Step 210 confirm that the cell-balancing starting condition has been reached (Yes from Step 210).

The two stages 250, 252 illustrated in FIG. 3 correspond to the pre-qualification and qualification stages 106, 108 that are illustrated in FIG. 2. The first stage 250, 106 is a qualification stage in the sense that it proceeds until the cell-balancing starting condition has been achieved (Yes from Step 204), but the qualification that occurs in the first stage 250, 106 is preliminary in the sense that voltage measurements that are performed during Step 204 are not as accurate as possible (because charging continues during Step 204, which creates impedance and other effects). The second stage 252, 108 is a full qualification stage in the sense that the qualification that can be reached in Step 210 is based on accurate measurements (because charging is suspended, and the system is given time to settle).

The two-stage approach described above solves a number of potential problems. Among other things, if charging were never suspended during voltage measurement, the measurement could be problematically inaccurate, due to impedance effects, among other potential factors. By suspending charging during measurement (Step 210 follows Step 208), voltage measurement can be performed more accurately. The charging device 10 is able to provide this advantage because the charging component 70 and the measurement component 72 are configured to operate independently within the charge control circuit 66. The current source 64 can be operated by the charge control circuit 66 to continue to charge the battery array 12 while the measuring component 72 determines the voltages of the individual battery cells by reading corresponding voltages on the conductive lines 50, 51.

Moreover, even if charging were suspended during voltage measurement, if the voltage measurement occurred before waiting for a time $T_{SETTLE}$ after the suspension of charging, the measurement could still be problematically inaccurate. Undesirable impedance effects could still be caused by residual current flow through the battery cells 14 and other devices. By waiting an appropriate time (during Step 208) for the battery array 12 and the charging device 10 to settle, the individual voltages of the battery cells 14 can be more accurately determined. The charging device 10 is able to provide this advantage because the charge control circuit 66 has a timer 68 connected to the charging component 70 and configured such that the measuring component 72 does not begin measuring immediately after the charging component 70 causes (78) the current source 64 to suspend charging, but defers measurement until a predetermined settling time $T_{SETTLE}$ (determined by the timer 68) has elapsed after charging has been suspended.

Thus, important advantages, including improved measurement accuracy, are achieved by the charging device 10 being able to suspend charging during measurement, and even more so by the charging device 10 being able to suspend charging, then wait for the settling time $T_{SETTLE}$ to elapse, and then begin the voltage measurements. The advantages are achieved during the second stage 252 (that is, during the qualification stage 108, FIG. 2), and also during Steps 306, 308 (illustrated in FIG. 4, and described in more detail below). However, if charging were suspended for every desired measurement, then the entire charging process could be problematically too long (that is, the entire charge process could take longer than desired). To overcome this potential problem, the charging device 10 conducts some measurements (for example, during the first stage 250 (FIG. 2) without suspending charging.

According to this disclosure, the measuring component 72 (an element of the charge control circuit 66) sometimes makes voltage-determination measurements based on voltages on the conductive lines 50, 51 without suspending charging (Step 204, FIG. 3), and such measurements are considered accurate enough for purposes of the first stage 250, until a determination is made that a cell balancing starting condition exists (YES from Step 204). Once the existence of the cell balancing condition has been determined to exist, then voltage measurements are conducted while charging is suspended, and after providing time $T_{SETTLE}$ for the device 10 and the battery array 12 to settle (Steps 208, 210 follow YES from Step 204). The charging device 10 is able to provide these advantages (during the pre-qualification stage 106, FIG. 2) because the charging component 70 and the measuring component 72 are configured to operate independently within the charge control circuit 66, but under the control of the processor 74 and the timer 68.

Active cell-balancing starts (Step 300, FIG. 4) when the process reaches Step 212 of FIG. 3, and the charging device 10 immediately starts to operate in a charge-enable and cell-balancing discharge mode (Step 302). During the charge-enable and cell-balancing discharge mode (Step 302), the charging device 10 applies a charging current to the battery cells 14. At the same time, the cell balancing circuit 80 closes the switch 56 which corresponds to the most highly-charged of the battery cells 14 so that the positive and negative terminals 24, 26 of the most highly-charged of the battery cells 14 are electrically connected to each other through one or more respective resistors 32. By permitting current to be conducted through the resistor(s) 32, and through the corresponding closed conducting circuit 58, the charging current that is applied to the most highly-charged of the battery cells 14 is reduced to $I_{EFFECTIVE}$ (FIG. 2), which is less than the current $I_{CHG}$ that is applied to the other battery cells 14. The difference $I_{DIFF}$ between $I_{CHG}$ and $I_{EFFECTIVE}$ is related to the voltage drop across the respective closed conducting circuit 58.

However, if at any time the charge-control circuit 66 determines, from measurements performed by the measurement component 70 on two adjacent ones of the third and fourth conductive lines 50, 51, that a current over a predetermined threshold is being conducted through a closed switch 56, then an error signal is communicated (84) to the cell-balancing circuit 80. In response to the error signal, the cell-balancing circuit 80 actuates the corresponding cell-balancing switch 79 and thereby causes the switch 56 that is in the over-current condition to open.

Referring again to FIG. 4, as soon as the charging device 10 begins the charge-enable and cell-balancing discharge mode (Step 302), the timer 68 is reset (T=0) and started, and the charging device 10 then waits until the timer 68 reaches T=$T_{ACTIVE}$ (Step 304), which is, for example, the same as $T_{QUAL}$. In each case, $T_{ACTIVE}$ and $T_{QUAL}$ is a unit of time during which charging of the battery cells 14 continues without measurement. Therefore, in each case, if $T_{ACTIVE}$ and/or $T_{QUAL}$ is too small a value, the device 10 inefficiently conducts measurements too often. On the other hand, if $T_{ACTIVE}$ and/or $T_{QUAL}$ is too large a value, then the desired measurements are not taken often enough, such that the cell-balancing active stage 110 (FIG. 2) might start too soon or finish too late to achieve the desired efficient and complete charging of all of the battery cells 14.

Figure 4:
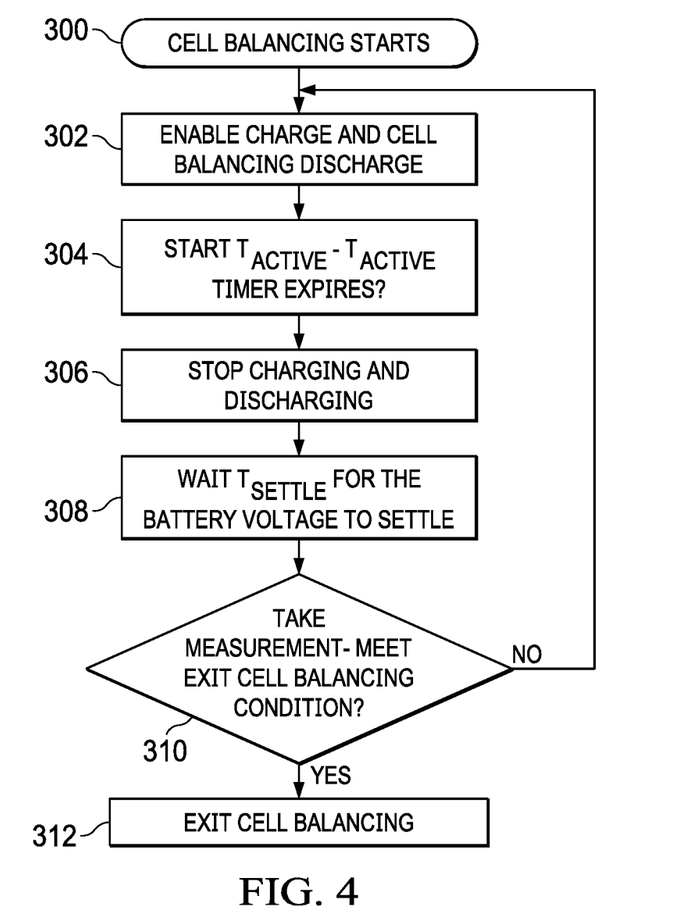
FIG. 4 is another flowchart for the method of operating the charging device of FIG. 1.

When the timer 68 reaches T=$T_{ACTIVE}$ (Yes from Step 304), then charging of the battery cells 14 is discontinued and discharging of the battery cells 14 is discontinued (Step 306). Then, as soon as charging and discharging are suspended (Step 306), the timer is reset (T=0) and started, and the charging device 10 waits until the timer 68 reaches $T_{SETTLE}$ (Step 308). The battery cells 14 are permitted to settle for similar reasons and under similar conditions as in Step 208. The settling time ($T_{SETTLE}$) is, if desired, the same value for Steps 208 and 308, or they can be different and/or individually user programmable to accommodate preferences of rapid charging time and accurate and complete charging.

In FIG. 4, $T_{ACTIVE}$ is the interval of time between each cell balancing measurement. In other words, $T_{ACTIVE}$ is the amount of time the process takes to advance from Step 300 to Step 306, which can be the same amount of time the process takes to advance from Step 310 to Step 306. In the illustrated embodiment, $T_{ACTIVE}$ is, for example, in the range of from 1.5 minutes to 2.5 minutes, more preferably about 2.0 minutes. These numerical values, however, are merely examples. If desired, the process can be operated with higher or lower values. If desired, $T_{ACTIVE}$ is user-programmable.

Important advantages, including improved measurement accuracy, are achieved, during the cell-balancing active stage 110 (that is, after Step 212, FIG. 3, and after Step 300, FIG. 4), by the charging device 10 being able to suspend charging during measurement, and even more so by the charging device 10 being able to suspend charging, then wait for the settling time $T_{SETTLE}$ to elapse, and then begin voltage measurements. The advantages are similar to those achieved during the qualification stage 108 (FIG. 2), that is, during the second stage 252 illustrated in FIG. 3. However, if charging were suspended for every measurement in the process, then the entire charging process could be problematically too long. To overcome this potential problem, as described above, the charging device 10 conducts some measurements (especially, for example, during the first stage 250, FIG. 2) without suspending charging. The charging device 10 is able to provide these advantages (during the cell-balancing active stage 110) because the charging component 70 and the measuring component 72 operate independently, but under the control of the processor 74 and the timer 68.

If the battery cell charging system 10 determines that the exit cell-balancing condition has been satisfied (Yes from Step 310), then the charging device 10 enters an exit cell-balancing stage (Step 312) 112 (FIG. 2). As illustrated in FIG. 2, during the exit cell-balancing stage 112, the charging current may be, if desired, reduced to $I_{TERM}$=$I_{TRICKLE}$, and then, subsequent to Step 312, the charging device 10 can be disconnected from the battery pack 16, such that no charging current (I=0) is applied to any of the battery cells 14. According to one aspect of this disclosure, it is not necessary to reduce the charging current to $I_{TERM}$. During or after the charging cycle, the battery cells 14 can be used to provide power for the electronic device 20 until one or more of the battery cells 14 requires recharging, and then the single-cycle recharging process illustrated in FIGS. 3 and 4 can be performed again to recharge the battery cells 14.

The devices, systems, and processes described herein can provide improved cell measurement accuracy. The measurement error of the voltage difference between two cells during cell balancing is related to line impedance, cell impedance, charge and discharge current. By suspending charge and discharge before measuring cell voltages with a wait time added for battery voltage to settle, the measurement error that would otherwise be incurred due to cell impedance variation with the impact of charging or discharging can be avoided or minimized. Also, remote voltage sense on the battery voltage is used to reduce the error due to line impedance.

What have been described above are examples. This disclosure is intended to embrace alterations, modifications, and variations to the subject matter described herein that fall within the scope of this application, including the appended claims. As used herein, the term "includes" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

The invention claimed is:

1. An integrated circuit device comprising:
    conductive lines adapted to be coupled to battery cells;
    a charge control circuit coupled to the conductive lines the charge control circuit including period timer circuitry, charging circuitry, measuring circuitry, processor circuitry, and memory circuitry, all coupled to the conductive lines, the charge control circuitry:
    in a first stage, measuring voltage on the battery cells while applying a charging current to the battery cells;
    determining by the measuring that one of the battery cells has a voltage equal to or greater than a first threshold voltage, and that a difference in voltage between a most highly-charged cell and another cell meets a second threshold voltage different than the first threshold voltage;

after the determining and in a second stage, balancing charging the battery cells by repeatedly removing the charging current from the battery cells during a settling period, measuring voltage on the battery cells after the settling period, and applying the charging current to the battery cells after the measuring; and exiting the balancing when the measured voltage on the battery cells reach a desired voltage.

2. The device of claim 1, including a cell balancing circuit coupled to the switches that are coupled to the conductive lines to selectively operate the switches, the cell balancing circuit is configured to operate one of the switches to reduce charge applied to one of the battery cells in response to a voltage measurement exceeding a predetermined threshold.

3. The device of claim 2, including connectors adapted for connecting the device to the battery cells.

4. The device of claim 1 in which the timer circuitry determines the settling period for the second stage, during which application of charge by the charge control circuit is suspended.

5. The device of claim 4, in which the timer circuitry is configured to determine a qualification time during which the charge control circuit applies charge to charge the battery cells in the second stage.

6. The device of claim 5 including a current source coupled to the charge control circuit for operating the charge control circuit.

7. A system for charging battery cells, comprising:
battery connectors adapted to be connected to series connected battery cells;
a current source;
conductive lines coupled to the battery connectors;
a charge control circuit coupled to the conductive lines and coupled to the current source, the charge control circuit including period timer circuitry, charging circuitry, measuring circuitry, processor circuitry, and memory circuitry, all coupled to the conductive lines, the charge control circuitry:
in a first stage, measuring voltage on the battery cells while applying a charging current to the battery cells;
determining by the measuring that one of the battery cells has a voltage equal to or greater than a first threshold voltage, and that a difference in voltage between a most highly-charged cell and another cell meets a second threshold voltage different than the first threshold voltage;
after the determining and in a second stage, balancing charging the battery cells by repeatedly removing the charging current from the battery cells during a settling period, measuring voltage on the battery cells after the settling period, and applying the charging current to the battery cells after the measuring; and
exiting the balancing when the measured voltage on the battery cells reach a desired voltage.

8. The system of claim 7, including a cell balancing circuit configured to select and operate a switch to discharge current through a corresponding resistor in response to a voltage measurement for a battery cell which exceeds a predetermined threshold.

9. The system of claim 7 in which the timer circuitry determines the settling period during which charging of the battery cells is suspended.

10. A process of charging series connected battery cells comprising:
in a first stage, measuring voltage on the battery cells while applying a charging current to the battery cells;
determining by the measuring that one of the battery cells has a voltage equal to or greater than a first threshold voltage, and that a difference in voltage between a most highly-charged cell and another cell meets a second threshold voltage different than the first threshold voltage;
after the determining and in a second stage, balancing charging the battery cells by repeatedly removing the charging current from the battery cells during a settling period, measuring voltage on the battery cells after the settling period, and applying the charging current to the battery cells after the measuring; and
exiting the balancing when the measured voltage on the battery cells reach a desired voltage.

11. The process of claim 10 in which the applying a charging current to the battery cells in the first stage includes applying a trickle charging current to the battery cells for a first period.

12. The process of claim 11 including at the end of the first period, applying a pre-charge charging current that is greater than the trickle charging current to the battery cells for a second period.

13. The process of claim 12 including at the end of the second period, applying a normal charging current that is greater than the pre-charge charging current to the battery cells for a third period.

14. The process of claim 13 including at the end of the third period and for a fourth period, while maintaining the normal charging current to the series connected battery cells, performing the determining.

15. The process of claim 10 in which the balancing includes conducting current through a resistor coupled to a selected battery cell while applying the charging current to the battery cells after the measuring.

16. The process of claim 15 including reducing the charging current applied to the battery cells in response reaching a threshold voltage across the resistor.

17. The process of claim 10 in which the settling period is in a range of from 0.5 second to 1.5 seconds.

18. The process of claim 17 including setting the settling period with a timer circuit.

19. The process of claim 10 including performing the determining twice before performing the balancing.

20. The process of claim 10 in which the applying the charging current to the battery cells after the measuring includes applying the charging current to the battery cells after the measuring for a charging period in a range of from 1.5 minutes to 2.5 minutes.

* * * * *